United States Patent
Lanzano' et al.

(10) Patent No.: US 11,372,224 B2
(45) Date of Patent: Jun. 28, 2022

(54) METHOD OF STIMULATED EMISSION DEPLETION MICROSCOPY HAVING HIGH SPATIAL RESOLUTION

(71) Applicant: FONDAZIONE ISTITUTO ITALIANO DI TECNOLOGIA, Genoa (IT)

(72) Inventors: Luca Lanzano', Genoa (IT); Paolo Bianchini, Genoa (IT); Giuseppe Vicidomini, Genoa (IT); Alberto Diaspro, Genoa (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 153 days.

(21) Appl. No.: 16/756,281

(22) PCT Filed: Oct. 19, 2018

(86) PCT No.: PCT/IB2018/058123
§ 371 (c)(1),
(2) Date: Apr. 15, 2020

(87) PCT Pub. No.: WO2019/077556
PCT Pub. Date: Apr. 25, 2019

(65) Prior Publication Data
US 2020/0333573 A1    Oct. 22, 2020

(30) Foreign Application Priority Data
Oct. 19, 2017   (IT) .......................... 102017000118432

(51) Int. Cl.
*G01N 21/64*    (2006.01)
*G02B 21/00*    (2006.01)
*G02B 21/36*    (2006.01)

(52) U.S. Cl.
CPC ..... *G02B 21/0076* (2013.01); *G01N 21/6458* (2013.01); *G01N 21/6486* (2013.01); *G02B 21/0084* (2013.01); *G02B 21/365* (2013.01)

(58) Field of Classification Search
CPC .......................... G02B 21/365; G01N 21/6486
See application file for complete search history.

(56) References Cited

U.S. PATENT DOCUMENTS
2012/0097865 A1    4/2012 Lippert

FOREIGN PATENT DOCUMENTS
WO    2015/022635 A1    2/2015

OTHER PUBLICATIONS

Fan et al. All-optical fluorescence image recovery using modulated stimulated emission depletion, Chemical Science vol. 2, No. 6, pp. 1080-1085 (Year: 2011).*

(Continued)

*Primary Examiner* — David P Porta
*Assistant Examiner* — Shun Lee
(74) *Attorney, Agent, or Firm* — Merchant & Gould P.C.

(57) ABSTRACT

Method for increasing the optical resolution of a stimulated emission depletion microscope, or STED microscope (Stimulated Emission Depletion), based on the modulation of the intensity of a STED beam on an arbitrary time scale during the acquisition of an image and the analysis of the induced dynamics, without increasing the intensity of the STED beam and in a simple and economic manner.

12 Claims, 7 Drawing Sheets

(56) References Cited

OTHER PUBLICATIONS

Doronina-Amitonova et al. Ultrahigh-contrast imaging by temporally modulated stimulated emission depletion, Optics Letters vol. 40, No. 5, pp. 725-728 (Year: 2015).*

L.V. Doronina-Amitonova et al., "Ultrahigh-contrast imaging by temporally modulated stimulated emission depletion". Optics Letters 40, 725-728 (2015).

Chaoyang Fan et al. "All-optical fluorescence image recovery using modulated stimulated emission Depletion", Chemical Science 2, 1080-1085 (2011).

Lanzano et al., "Encoding and decoding spatio-temporal information for super-resolution microscopy," Nat Commun 6, 6701 (2015).

International Search Report and Written Opinion issued in corresponding application PCT/IB2018/058123, completed on Jan. 8, 2019 and dated Jan. 25, 2019.

Katrin I Willig et al., "STED microscopy with continuous wave beams", Nature Methods, vol. 4, No. 11, Nov. 1, 2007 (Nov. 1, 2007), pp. 915-918.

Yue Fang et al., "Enhancing the resolution and contrast in CW-STED microscopy", Optics Communications, vol. 322, Jul. 1, 2014 (Jul. 1, 2014), pp. 169-174.

\* cited by examiner

METHOD OF STIMULATED EMISSION DEPLETION MICROSCOPY HAVING HIGH SPATIAL RESOLUTION

CROSS-REFERENCE TO RELATED APPLICATIONS

This application is a national stage application of PCT/IB2018/058123, filed Oct. 19, 2018, which claims benefit of Italian patent application 102017000118432, filed Oct. 19, 2017, and which applications are incorporated herein by reference. To the extent appropriate, a claim of priority is made to each of the above-disclosed applications.

TECHNICAL FIELD

The present invention relates to a method for increasing the optical resolution of a stimulated emission depletion microscope, or STED microscope (Stimulated Emission Depletion) based on the modulation of the intensity of a STED beam on an arbitrary time scale during the acquisition of an image and the analysis of the induced dynamics, without increasing the intensity of the STED beam and in a simple and economic manner. Such method is based on the principle that the fluorescence at the centre of an observation volume is not modulated, while the fluorescence at the periphery of said volume is modulated. The exploitation of this difference in the modulation of the fluorescence signal entails an increase in the spatial resolution.

BACKGROUND OF THE INVENTION

STED microscopy is one of the many different types of super-resolution microscopy techniques which have been recently developed to increase spatial resolution through exceeding the limit of diffraction of conventional light microscopy.

The main application of STED microscopy is directed to the study of sub-cellular architectures and dynamics and takes advantage of the non-linear response of fluorophores commonly used for marking biological samples. One sample is excited with a first radiation beam, the excitation beam, and the fluorescence is measured in a conventional manner. One donut-shaped second radiation beam, the STED beam, de-energizes by stimulated emission the fluorophores in an annular region around the axis of the first beam, allowing receiving the signal only from the central region of the first beam. The mechanism responsible for the increase in resolution is the saturation of the fluorescence reduction by stimulated emission. With STED microscopy high spatial resolutions were reached.

The spatial resolution w of a STED microscope depends on the intensity $I_{STED}$ of the STED beam according to the equation:

$$\frac{1}{w^2} = \frac{1}{w_0^2}\left(1 + \frac{I_{STED}}{I_{sat}}\right) \quad \text{Eq. 1}$$

wherein $w_0$ is the spatial resolution of the confocal microscope used in STED microscopy and $I_{sat}$ is a constant representing the intensity value of the STED beam, required to increase the resolution of a factor $\sqrt{2}$ that depends on the sample. In theory, an unlimited spatial resolution could be obtained by increasing the intensity value $I_{STED}$ of the STED beam. In most practical cases, the maximum resolution of a STED microscope is limited by the maximum power "tolerated" by the sample due to detrimental photo-damage effects induced by illumination with the STED beam, such as for example phototoxicity and photobleaching. For this reason strategies were developed to increase the spatial resolution without increasing the intensity of the STEAD beam. For example, document WO2015/022635 A1 discloses a method that uses a pulsed excitation beam (in the picoseconds time scale) and a continuous wave, by varying the detection time window. Since the average life of the fluorescent decay after a pulsed excitation is always in the time scale of nanoseconds, such method involves the use of an ultra fast detection electronics in the time scale of nanoseconds. In document L. V. Doronina-Amitonova et al, 'Ultrahigh-contrast imaging by temporally modulated stimulated emission depletion', Optics Letters 40, 725-728 (2015), STED light beams are used with a Gaussian time-modulated spatial pattern, whereby the whole fluorescence signal is modulated in order to distinguish it from a background signal, thereby increasing the contrast of fluorescence images, but without increasing the resolution thereof. Also document Chaoyang Fan et al, 'All-optical fluorescence image recovery using modulated stimulated emission Depletion', Chemical Science 2, 1080-1085 (2011), uses STED light beams with a Gaussian time-modulated spatial pattern, only modestly increasing the resolution. In the document by Lanzanò et al, "Encoding and decoding spatio-temporal information for super-resolution microscopy". Nat Commun 6, 6701 (2015), a method of analysis called SPLIT (Separation of photons by Lifetime Tuning) is described, which improves the spatial resolution by recording the temporal decay of the fluorescence signal and using the additional information encoded in the fluorescence decay dynamics. This is obtained by separating one super-resolved component, characterized by a specific temporal footprint. In fact, the key idea on which the SPLIT analysis method is based is that for each pixel the fluorescence intensity decay can be described as the linear superposition of one slow decay component (due to fluorophores in the centre of the actual observation volume) and one fast decay component (due to fluorophores at the periphery of the actual observation volume). By using an algorithm based on Fourier transform of decays, the fraction associated with the slow component can be extracted effectively without using minimization algorithms, with consequent increase in the spatial resolution. Even the SPLIT analysis method requires the use of a pulsed excitation and ultra fast detection electronics, in order to record the fluorescence dynamics in the time scale of nanoseconds.

SUMMARY OF THE INVENTION

The object of the present invention is to overcome the disadvantages described heretofore, allowing to increase the optical resolution of a STED microscope in a reliable, simple and economical way, without increasing the intensity of the STED beam and without work in the time scale of nanoseconds.

It is therefore one specific object of the present invention a method for increasing the optical resolution of a microscope STED based on the modulation of an intensity of a STED beam during the acquisition of an image as defined by independent claim 1.

Further embodiments of the method according to the invention are defined in the dependent claims.

The advantages offered by the method according to the invention with respect to the solutions of the prior art are numerous and important.

First of all, the method uses one STED light beam having a donut-shaped spatial pattern (in English doughnut or donut) which has the advantage of acting only on the periphery of the observation volume of the microscope. Thanks to the "donut" shape, since only the signal at the periphery is modulated, the latter can be subtracted from the whole signal and a smaller observation volume can be obtained. In other words, the method advantageously allows increasing the spatial resolution without increasing the intensity of the STED beam, thus avoiding damaging the sample. Moreover, the method of the present invention based on the slow modulation of the intensity of the STED beam and the analysis of the dynamics induced entails a general simplification of procedure and can be integrated into any STED microscope. The fluorescence modulation at the periphery of the observation volume is performed on an arbitrary time scale, whereby it is not necessary to use a pulsed excitation beam. This entails the advantage of being able to use light sources such as for example laser, which are inexpensive compared to those required for a pulsed excitation of other techniques. Another important advantage is that it is not necessary to detect the fluorescence dynamics in the time scale of nanoseconds and therefore a simple and economical electronic detection can be used.

BRIEF DESCRIPTION OF THE DRAWINGS

The present invention will be now described, for illustrative but not limiting purposes, according to its preferred embodiments, with particular reference to the Figures of the accompanying drawings, wherein.

DETAILED DESCRIPTION

In the Figures the same reference numerals will be used for similar elements.

Figure 1:
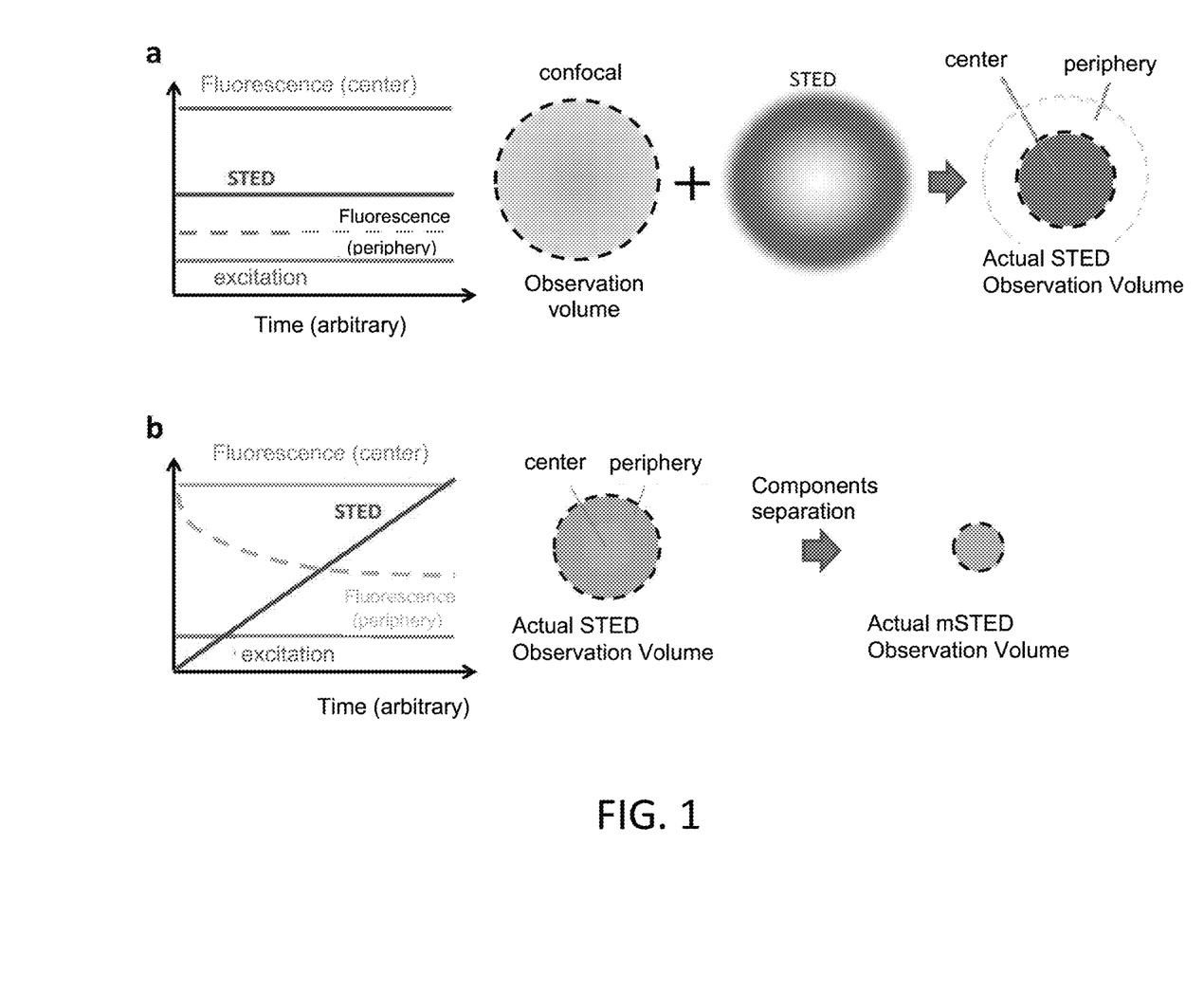
FIG. 1 is a diagram of the principles on which standard STED microscopy (1a) and STED microscopy integrated with the present method (1b) are based.

With reference to FIG. 1a, the principle on which STED microscopy is based is that excited fluorophores at the periphery of a confocal observation volume are "turned off" in a selective manner by means of a (donut-shaped) second beam, the STED beam. Since the fluorophores at the centre are not turned off, a smaller actual STED observation volume and an increase in the spatial resolution are obtained. The maximum resolution of a STED microscope is determined by the ability to turn off the molecules at the periphery of the observation volume, and this is generally determined by the intensity $I_{STED}$ of the STED beam. The method of the present invention provides for a significant increase of the resolution by modulation of the STED beam intensity but without increasing the average intensity of the STED beam, as shown schematically in FIG. 1b. The STED beam modulation generates spatial variations in the temporal dynamic within the actual STED observation volume. The analysis of the signal temporal evolution allows to separate smaller actual STED-modulated observation volume characterized by a specific temporal footprint.

Figure 2:
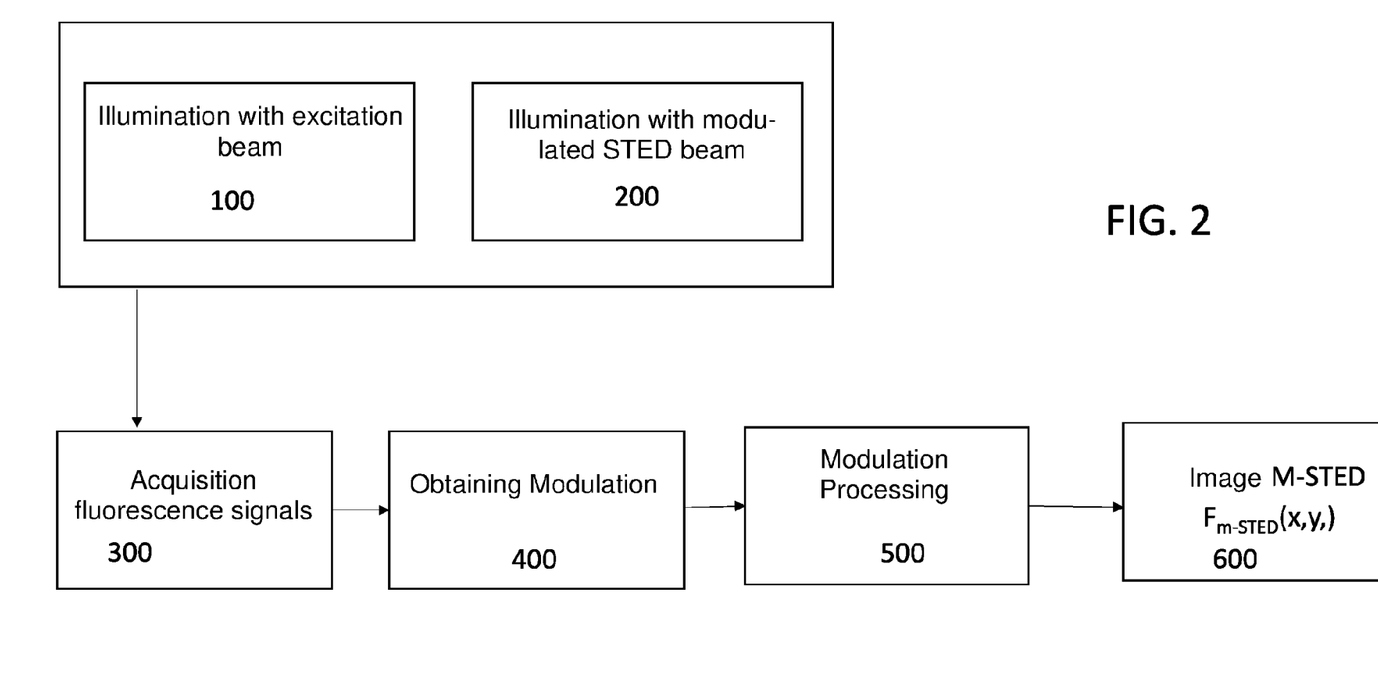
FIG. 2 is a flow diagram of a first embodiment of the method for increasing the optical resolution of a STED microscope, according to the invention.

FIG. 2 is a flow diagram of a first embodiment of the method for increasing the optical resolution of a STED microscope. Advantageously, the method is performed automatically. In an initial step 100 a sample is illuminated with either a pulsed or continuous excitation light beam with constant excitation intensity, in order to excite fluorophores in the sample. In a step 200 the sample is illuminated with a depletion light beam, either pulsed or continuous, STED beam, modulated to de-energize fluorophores by stimulated emission, i.e. the intensity $I_{STED}$ of the STED beam is modulated over time, $I_{STED}=I_{STED}(t)$, by generating spatial variations in the temporal dynamic inside an actual observation volume of the sample. On an image plane xy of pixels, the image is given by an image function $F=F(x,y)$ which is expressed as the convolution of a distribution of a sample object $\rho(x', y')$ and a point spread function, (PSF, Point Spread Function) of the microscope. It should be noted that in general the distribution of a sample object is three-dimensional, but since the preferred embodiments of the method described later have an effect only on the xy plane, the distribution is approximated on the xy plane. It should be noted that it is possible to extend the method also to the third spatial axis to increase also the lateral resolution of the image. By assuming a PSF of Gaussian shape, the convolution equation is:

$$F(x, y) = \int dS \rho(x', y') e^{-\frac{2r^2}{w^2}}, \qquad \text{Eq. 2}$$

wherein dS is an infinitesimal surface element and w is the spatial resolution expressed by Eq. 1, whereby the Eq. 2 can be rewritten as:

$$F_{STED}\left(x, y, \frac{I_{STED}}{I_{sat}}\right) = \int dS \rho(x', y') e^{-\frac{2r^2}{w_0^2}\left(1+\frac{I_{STED}}{I_{sat}}\right)}. \qquad \text{Eq. 3}$$

with $F_{STED}$ an image function obtained with STED microscopy. It should be noted that the Eq. 2 and 3 represent the integral of the contributions of all fluorophores to the fluorescence signal. The intensity modulation of the STED beam performed at step 200 also causes the image function of the Eq. 3 to be a function of time:

$$F_{t\text{-}STED}(x, y, t) = \int dS \rho(x', y') e^{-\frac{2r^2}{w_0^2}\left(1+\frac{I_{STED}(t)}{I_{sat}}\right)}, \qquad \text{Eq. 4}$$

wherein the subscript "t-STED" indicates an image resolved in time, obtained through modulation of the intensity of the STED beam. The modulation of the image function F is then obtained by the modulation of $I_{STED}(t)$ for each pixel.

In other words, if in a given pixel (x, y), the intensity $I_{STED}=I_{STED}(x, y, t)$ of the STED beam is modulated over time, a modulation M(x,y) of the value of the image function in that pixel, F=F(x, y, t) will result. Modulation M(x,y) of an image is defined as the quantity:

$$M(x, y) = \left| \frac{\delta F\left(x, y, \frac{I_{STED}}{I_{sat}}\right)}{F\left(x, y, \frac{I_{STED}}{I_{sat}}\right)} \right| = \quad \text{Eq. 5}$$

$$\frac{\int dS \rho(x', y') e^{-\frac{2r^2}{w_0^2}\left(1+\frac{I_{STED}}{I_{sat}}\right)} \frac{2r^2}{w_0^2}}{\int dS \rho(x', y') e^{-\frac{2r^2}{w_0^2}\left(1+\frac{I_{STED}}{I_{sat}}\right)}} \delta\left(\frac{I_{STED}}{I_{sat}}\right) =$$

$$= m(x, y) \delta\left(\frac{I_{STED}}{I_{sat}}\right).$$

The term m(x,y) contains sub-diffractive information on the distribution of the object ρ(x, y) in the vicinity of the position (x,y). The multiplication factor $\delta(I_{STED}(t)/I_{sat})$ is a function of the modulation of the intensity of $I_{STED}(t)$ of the STED beam.

In the first preferred embodiment of the method of FIG. 2, the modulation M(x,y) of the image function is calculated from the signal $F_{t-STED}(x,y,t)$ through an algorithm based on Fourier transforms. For each pixel, the amounts g(x,y) and s(x,y) according to the following formulas are first calculated:

$$g(x, y) = \frac{\sum_{j=1}^{N_t} F_{t-STED}(x, y, t)\cos(2\pi(j-1)/N_t)}{\sum_{j=1}^{N_t} F_{t-STED}(x, y, t)} \quad \text{Eq. 6}$$

$$s(x, y) = \frac{\sum_{j=1}^{N_t} F_{t-STED}(x, y, t)\sin(2\pi(j-1)/N_t)}{\sum_{j=1}^{N_t} F_{t-STED}(x, y, t)},$$

wherein $N_t$ is the total number of points in time wherein the signal $F_{t-STED}(x,y,t)$ is sampled. The modulation M(x,y) is then calculated in each pixel, as:

$$M(x,y)=\sqrt{(g(x,y))^2+(s(x,y))^2} \quad \text{Eq.7}$$

By the term M(x,y), one fraction $f_{center}(x,y)$ of intensity of the fluorescence signal, corresponding to the contribution to the fluorescence signal coming from the fluorophores at the centre of the observation volume, is calculated. In fact the modulation M(x,y) in a given pixel can be expressed as a combination of the modulation value at the centre of the observation volume $M_{center}$ and the modulation value in the periphery of the observation volume $M_{periph}$, according to the formula: $M(x,y)=f_{center}(x,y)M_{center}+f_{center}(x, y))M_{periph}$, wherein $M_{center}$ and $M_{periph}$ are two constant having non negative value. From this formula it is obtained:

$$f_{center}(x,y)=1-[M(x,y)-M_{center}]/[M_{periph}-M_{center}], \quad \text{Eq.8}$$

The values of the constants $M_{centerr}$ and $M_{periph}$ that allow to obtain a significant increase in resolution without the introduction of artefacts in the image, must be determined in the specific embodiment of the method, since they depend on some experimental features such as the modulation amplitude of the of the intensity of the STED beam and the signal to noise ratio of the acquired signals.

In the first preferred embodiment of the method of FIG. 2, the values of constants $M_{center}$ and $M_{periph}$ are determined as follows. The value of $M_{center}$ corresponds to the minimum modulation value measured in the sample to the given experimental conditions. In other words, the value of $M_{center}$ corresponds to the minimum modulation value for which the number of pixels is greater than or equal to a percentage 8, optionally equal to 10%, of the peak value of the histogram of of M(x,y) values. The value of $M_{periph}$ is calculated according to the equation:

$$M_{periph}=M_{center}+\sigma_2/(2|\sigma_1-\sigma_2|) \quad \text{Eq.9.}$$

wherein $\sigma_1$ and $\sigma_2$ are the values of the standard deviation of the bi-dimensional gaussian distribution approximating a bi-dimensional histogram of g(x,y) and s(x,y) values.

In other embodiments, the values of constants $M_{center}$ and $M_{periph}$ can be determined by using a known sample of fluorescent beads and evaluating the quality of the images obtained at different values of $M_{center}$ and $M_{periph}$.

Figure 7A:
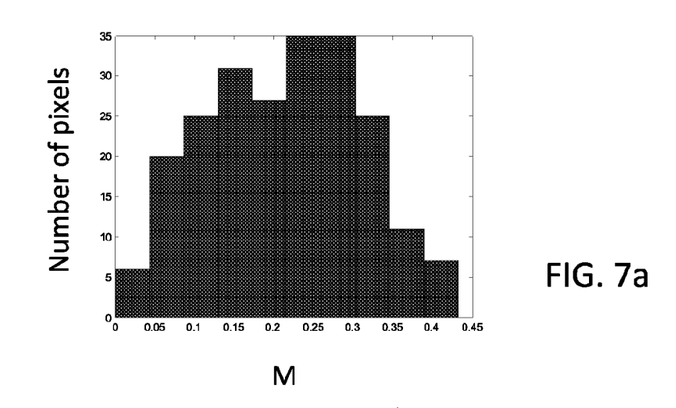
FIG. 7 illustrates the results of processing performed on simulated data in the first experiment of FIG. 3.
Figure 7B:
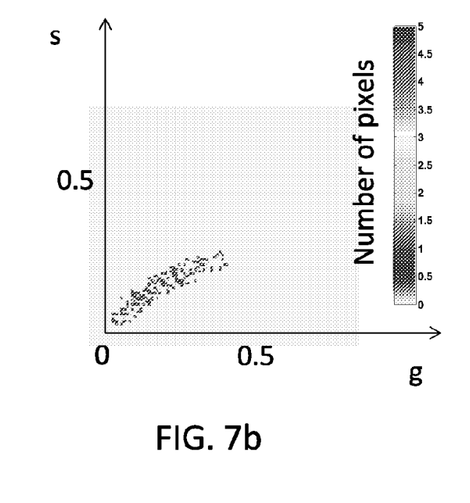
Figure 7C:
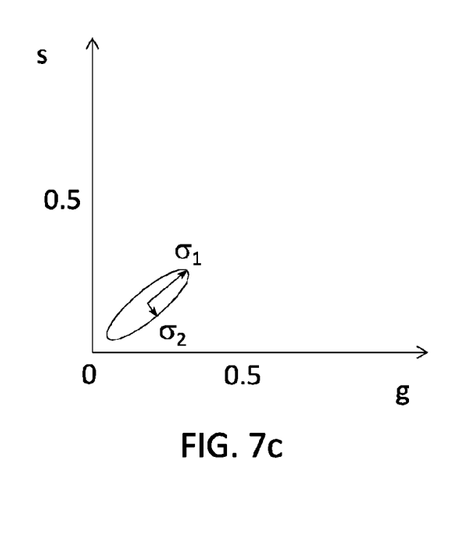

FIG. 7 illustrates some processing of data obtained in a first simulated experiment, corresponding to a first experiment carried out with the first preferred embodiment described above of the method according to the invention. Said first experiment will be described in detail below with reference to FIG. 3. FIG. 7a shows the histogram of the measured M(x,y) values from which $M_{center}$ is obtained, FIG. 7b shows the g(x,y) and s(x,y) values that are approximated with a bi-dimensional Gaussian distribution shown in FIG. 7c, whose standard deviation values are used for the calculation of $M_{periph}$.

By multiplying the fraction $f_{center}(x,y)$ for a STED image $F'_{STED}(x,y)$ a final image of higher resolution is obtained:

$$F_{m-STED}(x,y)=f_{center}(x,y)F'_{STED}(x,y) \quad \text{Eq.10,}$$

wherein the subscript "m-STED" indicates the STED technique with modulation of the intensity of the STED beam. The STED image $F'_{STED}(x,y)$ used to generate the image $F_{M-STED}(x,y)$ can be chosen between an image averaged in time $<F_{t-STED}(x,y,t)>$ and any image of the temporal series $F_{t-STED}(x,y,t)$.

All the above equations 2 to 9 are valid for slow modulations, i.e. for temporal variations slow with respect to r that is the fluorescence lifetime of the singlet excited state. Since τ is in the range of nanoseconds, it is in theory possible to modulate the STED intensity on any time scale T higher than nanoseconds, T>>1 ns. The speed of the actual modulation is limited by the specific hardware device used to modulate the STED beam. In general, the response of the modulation hardware device represents the lower limit at the time scale that can be used by the method. In fact, a too slow modulation could be disadvantageous in applications wherein a data acquisition high speed is required. In the first preferred embodiment of the method according to the invention, acoustic-optical modulators (AOM, acoustic-optical modulator) commonly employed in confocal microscopes are used, which are much faster than any mechanical device. The response of the AOM is approximately limited to the transit time of the sound wave through the beam, typically <50 ns. In further embodiments, opto-electronic modulators (EOM, Electro-optic modulator) are used, wherein the time limit of the response is equal to tens of nanoseconds.

In the first preferred embodiment, the modulation of the STED beam in step 200 has a temporal pattern corresponding to a linear ramp whereby from a minimum value $I_{min}$, optionally equal to zero at time to up to a maximum value $I_{max}$ at time $t_1=t_0+T$, i.e. in a time window T, wherein T is the modulation period. For which the intensity of the STED beam, set for the sake of simplicity also $t_0=0$, is given by:

$$I_{STED}(t) = I_{max} \frac{t}{T} \qquad \text{Eq. 11}$$

In the first preferred embodiment of the method, the time window T coincides with the typical time of integration of intensity in a pixel of a confocal or STED microscope (pixel dwell time), whose values are equal to about 10 μs up to about 100 μs.

The linear ramp temporal pattern has the advantage of making the analysis of the signal in the time domain more direct. In other embodiments of the present invention the modulation 200 of the STED beam is obtained with different temporal pattern, such as sinusoidal patterns.

Returning to the flow chart of FIG. 2, in a step 300 of the method, a series of images of fluorescence are acquired, i.e. are scanned, corresponding to the image function $F_{t\text{-}STED}(x, y, t)$ of Eq. 4, having increasing spatial resolution whereby the image at time T has the higher spatial resolution. The acquisition, i.e. the scanning, 300 of the fluorescence signal, is solved in time and synchronised with the modulation of the STED beam. Hence, the modulation period equal to T and the number of acquired time instants equal to n being set, the required temporal resolution is T/n. In a scanning STED microscope, moreover, the timed acquisition must be synchronized with the scanning parameters. In the first preferred embodiment, T coincides with the dwell time per total pixel. In other embodiments, the synchronization can be performed even with other parameters, for example with the line scan time. In this latter case, the scanning of a horizontal line in a given vertical position is performed consecutively for n times, using a different intensity level at each scan, and then it goes to a line on a different vertical position. In any case, at the end of acquisition 300, n fluorescence intensity values are associated with each pixel, which values will be processed in a step 400 to obtain the modulation M(x, y) of the image on each pixel given by Eq. 7. Optionally, at step 400 the intensity fluorescence values are processed to also calculate an averaged in time image $<F_{t\text{-}STED}(x,y,t)>$. Once the modulation M of the image is obtained, in a step 500 the contribution $f_{center}(x,y)$ to fluorescence, given by fluorophores positioned at the center of the observation volume, is calculated, whereby the fraction is obtained. In fact, the spatial distribution $\sigma_{I_{STED}}(x',y')$ of the intensity of the STED beam on the sample is given by:

$$\sigma_{I_{STED}}(x',y') = I_{STED}(t) h_{STED}(x',y') \qquad \text{Eq.12}$$

wherein $h_{STED}(X',Y')$ is a donut-shaped PSF of the STED microscope.

The fluorescence signal f(X',Y') from each single fluorophore inside the observation volume is approximated with an exponential decay:

$$f(x', y', t) \propto \exp\left[-\frac{h_{STED}(x', y') I_{STED}(t)}{I_{sat}}\right] = \qquad \text{Eq. 13}$$

$$\exp\left[-h_{STED}(x', y') \frac{I_{max}}{I_{sat}} \frac{t}{T}\right]$$

with a time constant of depletion $\tau_{dep}(x', y')$ which depends accordingly on the donut-shape of the PSF, on the saturation value $I_{sat}$, on the maximum intensity $I_{STED}$ of the STED beam and the size of the time window T, according to the following equation:

$$\tau_{dep}(x', y') = \frac{I_{sat} T}{I_{max} h_{STED}(x', y')} \qquad \text{Eq. 14}$$

It should be noted that, in this case, (x',y') corresponds to the distance from the center of a given pixel (x,y), whereby one more fluorophores can contribute to the fluorescence signal measured in a single pixel F(x,y).

The Equation 14 also shows that a spatial distribution of the depletion decay rate $\tau_{dep}^{-1}(x', y')$ is provided determined by the spatial distribution of $h_{STED}(x', y')$.

Since $h_{STED}(x', y')$ has a donut shape, the signal from the fluorophores located at the periphery of the observation volume (maximum values of $h_{STED}$) will decay more quickly while the signal from the center of the observation volume (values close to zero of $h_{STED}$) will remain approximately constant, as schematically shown in the graph of FIG. 1b. In other words, the signal of the fluorophores located on the periphery of the observation volume will be modulated while the signal from the center of the observation volume will not be modulated. This modulation gradient between the center and the periphery of the volume is used to separate from the total signal, the signal coming from the center. Since the modulation of the linear ramp of the STED beam induces an exponential decay of the fluorophores during the time window T, the separation at step 500 is performed with the same formalism used in the SPLIT technique, with the difference that the period T is not determined by the fluorescence decay of the fluorophores in the order of nanoseconds, but rather it is arbitrarily selected by setting the period T of the ramp (T>100 ns). In order to obtain significant spatial variations of $\tau_{app}(x', y')$, from Eq. 14 It is clear that $I_{max}$ must be of the magnitude order of $I_{sat}$. By the fluorescence image given by fluorophores positioned at the center of the observation volume, in a step 600 the final image $F_{M\text{-}STED}(x,y)$ given by Eq. 10 is obtained, with increased resolution with respect to the image that would be obtained without integrating the present method to the STED microscope, as can be seen schematically by comparing the actual observation volume obtained with standard STED microscopy of FIG. 1a and that obtained with STED microscopy integrated with the method of the present invention of FIG. 1b.

Figure 3:
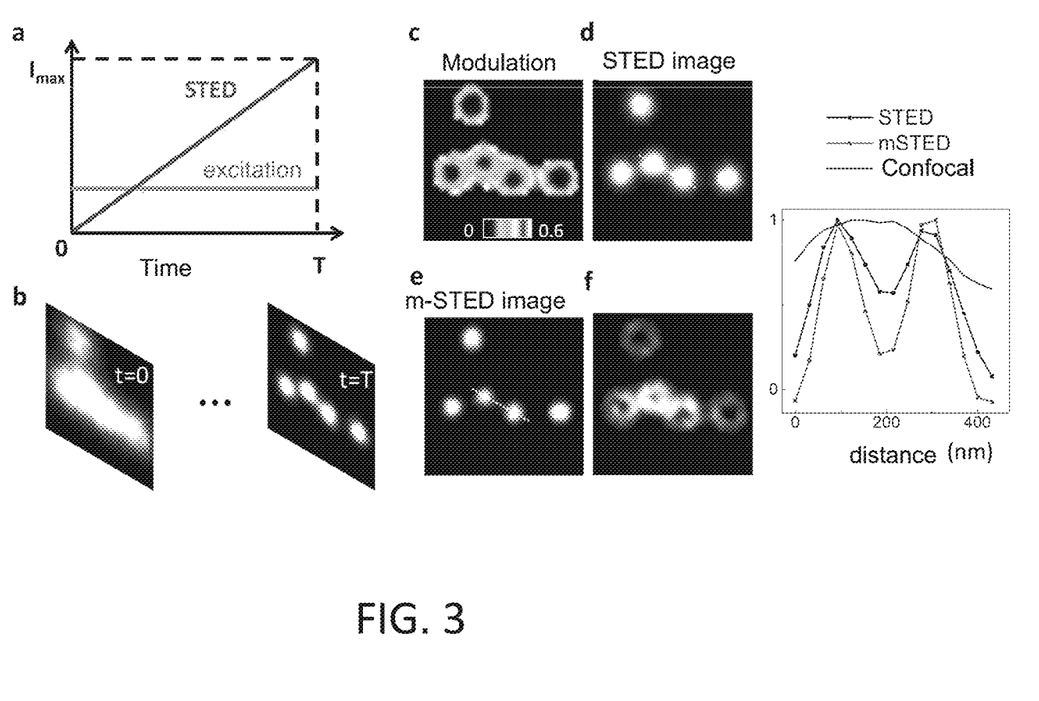
FIG. 3 schematically shows some of the results of a simulated first experiment, obtained by performing the first embodiment of the method of FIG. 2.

FIG. 3 shows the results of a first experiment simulated by the inventors who have applied a first preferred embodiment of the method of the present invention. The first simulated experiment consisted in having randomly located punctiform fluorophores in a sample and simulating an acquisition according to the first embodiment of the method with a modulation of the intensity of the STED beam in the time domain. The simulated image comprises 32×32 pixels, the pixel size is 20 nm, the value of $w_0=160$ nm, the value of $I_{max}/I_{sat}=4$, n=8. Close to zero, the donut shape $h_{STED}(x'y')$ is simulated with a parabolic approximation $h_{STED}(x'y') \sim 2r^2/w_0^2$. A sample is illuminated in step 100 with constant excitation intensity and is illuminated in step 200 with a modulated STED intensity with a linear ramp changing the STED intensity from value 0 to value $I_{max}$ in the time window T, shown in FIG. 3*a*. FIG. 3*b* shows a series of STED images having an increasing spatial resolution acquired at step 300. The image at t=0 has the lower spatial resolution, while the image at t=T has the highest spatial resolution. The shown variations of the fluorescence intensity for each pixel were then used to calculate at step 400 a modulation M(x,y) of the image shown in pseudo-coloured scale in FIG. 3*c*, which can be used to improve the STED image resolution that would occur with a continuous STED beam, with standard STED technique, equal to $I=I_{max}$ and whose fluorescence image is shown in FIG. 3*d*. By processing the modulation M of the image at step 500 through equation 8, which allows to calculate $f_{center}$ (x,y) described above, the contribution of the fluorophores located at the center of the observation volume, shown in the image of FIG. 3*e*, is separated from the contribution of those situated at the periphery, whose fluorescence image is shown in FIG. 3*f*. The final image called m-STED, which is that of FIG. 3*e* given by the contribution of the fluorescence of the fluorophores at the center, has a higher resolution than the STED image with the maximum resolution of FIG. 3*d*, as shown by a comparison of the line profiles shown in FIG. 3*g* (wherein it is also reported that obtained with confocal microscopy without STED technique).

Figure 4:
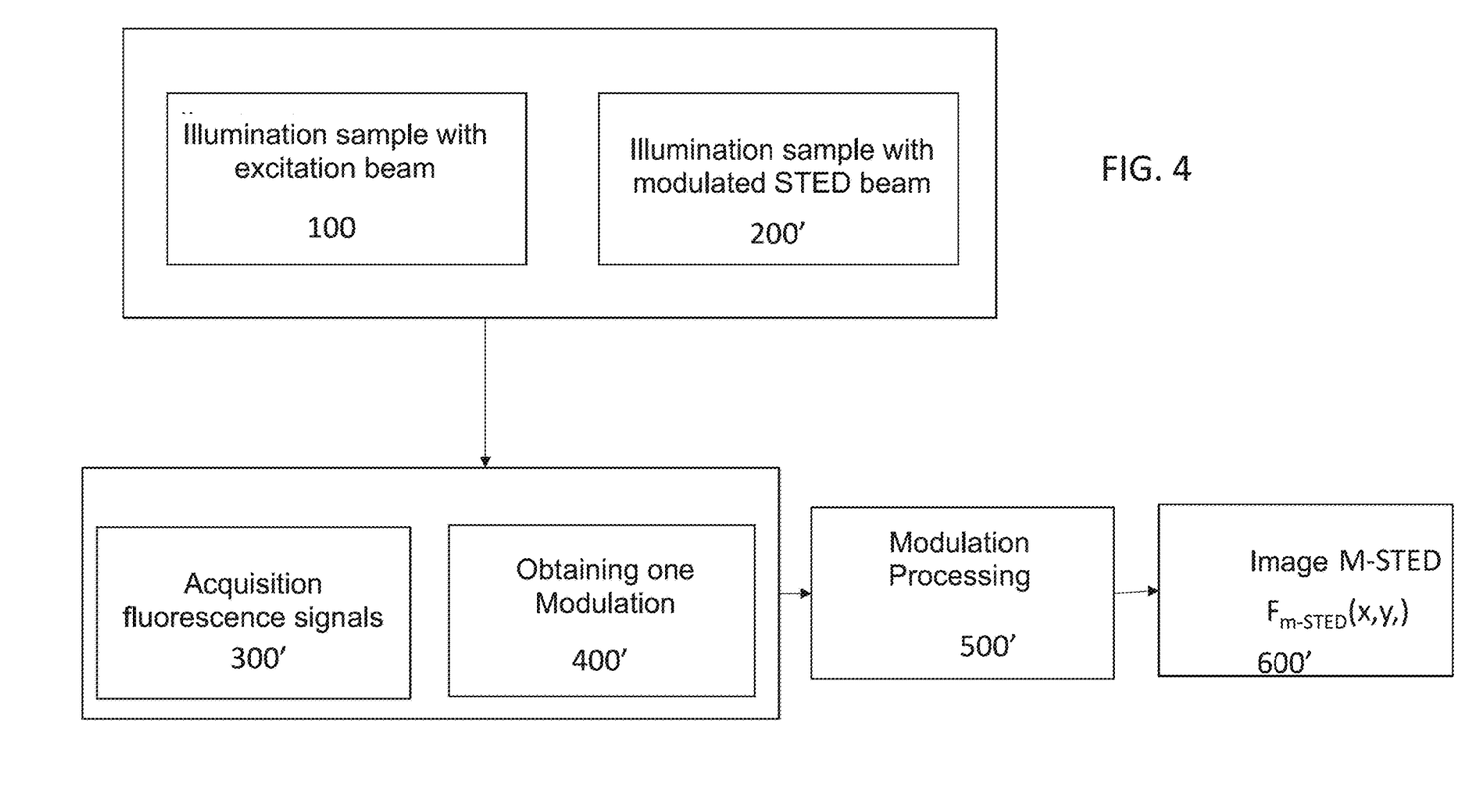
FIG. 4 is a flow diagram of a second embodiment of the method for increasing the optical resolution of a STED microscope, according to the invention.

In a second preferred embodiment of the method of FIG. 4 of the present invention, the temporal pattern of the modulation performed in a step 200' has a sinusoidal pattern with frequency ω:

$$I_{STED}(t) = I_0 - \Delta I_{STED} \sin(\omega t) \quad \text{Eq. 11'}$$

where $I_0$ is a value of average intensity and $\Delta I_{sted}$ is the intensity of modulation amplitude of the STED beam. The fluorescence signal f(x',Yy) coming from each single fluorophore inside the observation volume is also modulated according to the equation:

$$f(x', y', t) \propto \exp\left[-\frac{h_{STED}(x', y')I_{STED}(t)}{I_{sat}}\right] = \\ \exp\left[-h_{STED}(x', y')\frac{I_0 - \Delta I_{STED}\sin(\omega t)}{I_{sat}}\right] = \\ f_0(x', y')\exp\left[\frac{h_{STED}(x', y')\Delta I_{STED}\sin(\omega t)}{I_{sat}}\right] \quad \text{Eq. 13'}$$

$$\text{with } f_0(x', y') = \exp\left[-\frac{h_{STED}(x', y')I_0}{I_{sat}}\right]$$

The fluorescence signal f(x', y', t) is phase shifted with respect to a signal of the STED beam and will contain the main frequency ω and the higher harmonics due to the non-linearity of the exponential factor. The modulation M of the image can be obtained by analysing the fluorescence signal at a frequency ω or at higher frequencies. This can be done via a suitable hardware setting, wherein an analysis instrument acquires in a step 300' fluorescence signals from a sample and directly outputs, in a step 400', the values of the average intensity $<F_{t\text{-}STED}(x, y, t)>$ and of the modulation $M_\omega(x,y)$ of the fluorescence signal. A suitable hardware setting can be for example a standard lock-in detecting apparatus at frequency ω, wherein a lock-in amplifier directly provides, in addition to the average value of intensity $<F_{t\text{-}STED}(x, y, t)>$, the modulation values $M_\omega(x,y)$ and phase $\phi_\omega(x,y)$ during an acquisition 300' of fluorescence signals. Therefore, given an image $F_{t\text{-}STED}(x,y,t)$ obtained by modulating the intensity of the STED beam at a frequency ω, the increase of the resolution can be obtained in a step 600' by using the average intensity $<F_{t\text{-}STED}(x, y, t)>$ in pixel (x,y) and the signal modulation $M_\omega(x,y)$ on the same pixel:

$$F_{m\text{-}STED}(x,y) = f_{center}(x,y) \left\langle F_{t\text{-}STED}(x,Y,t) \right\rangle \quad \text{Eq. 10'}$$

where the fraction $f_{center}$ is calculated at a step 500' according to Equation 8:

$$f_{center}(x,y) = 1 - [M_\omega(x,y) - M_{center}]/[M_{periph} - M_{center}] \quad \text{Eq.8'}$$

The values of the constants $M_{center}$ and $M_{periph}$ can be determined as described above, taking into account that the values of g(x,y) and s(x,y) can be obtained from $M_\omega(x,y)$ and $\phi_\omega(x,y)$ according to the following formulas:

$$g(x,y) = M_\omega(x,y)\cos(\phi_\omega(x,y))$$

$$s(x,y) = M_\omega(x,y)\sin(\phi_\omega(x,y)) \quad \text{Eq. 14}$$

Similarly to the case of the modulation of the intensity of the STED beam in the time domain, it is in theory possible to modulate the STED intensity on any frequency scale lower to Gigahertz, ω<<2π/1 ns i.e. ω/2π<<1 GHz. The frequency of the actual modulation is limited by the specific hardware device used to modulate the STED beam.

It should be noted that, in contrast to the first preferred embodiment of the method, in the case of the second preferred embodiment of the method step 400 for calculating the modulation M(x,y) of the image to obtain the final image $F_{M\text{-}STED}(x,y)$ at higher resolution is not necessary.

In a further embodiment of the method wherein the modulation is sinusoidal with frequency ω, $M_{center}=0$ is set, for which it is $$f_{center}(x, y) = 1 - \frac{M_\omega(x, y)}{K} \quad \text{Eq. 8''}$$

where K corresponds to a constant having a positive value $M_{periph}$ above defined between 0 and 1. Thus the final image that is obtained from Eq. 10' becomes:

$$F_{m\text{-}STED}(x, y) = \left[1 - \frac{M_\omega(x, y)}{K}\right]\langle F_{t\text{-}STED}(x, y, t)\rangle \quad \text{Eq. 10''}$$

Figure 5:
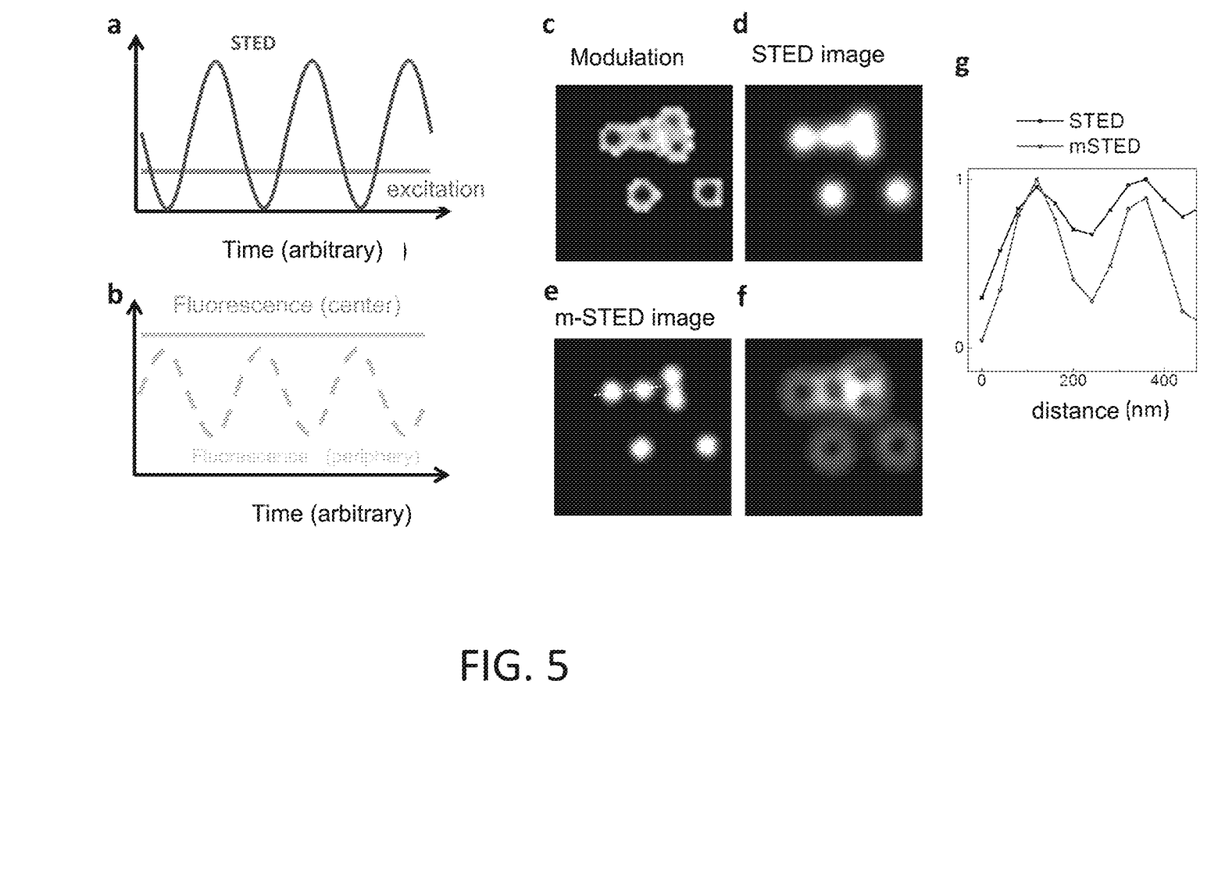
FIG. 5 schematically shows some of the results of a simulated second experiment, obtained by performing the second embodiment of the method of FIG. 4.

By changing the value of the constant K, it is possible to adjust the increase in resolution, FIG. 5 shows the results of a second experiment simulated by the inventors who have applied a second preferred embodiment of the method. The second simulated experiment consisted in using the same sample of the first experiment, i.e. with randomly located punctiform fluorophores, and simulating an acquisition according to the second embodiment of the method with a modulation of the intensity of the STED beam in the frequency domain. Similarly to the first simulated experiment the results of which are shown schematically in FIG. 3, the simulated image is 32×32 pixels, the pixel size is 20 nm, the value of $w_0=160$ nm, the value of $I_{max}/I_{sat}=4$, a modulation frequency f=ω/2π is equal to three times the inverse of the pixel dwell time. In this specific case the authors have used $\Delta I_{sted}=I_0$ (so that the STED intensity varies from 0 to a value $I_{max}=I_0+\Delta I_{STED}$). Close to zero, the donut shape $h_{STED}(x',y')$ is simulated with a parabolic approximation $h_{STED}(x',y') \sim 2r^2/w^2$.

A sample is illuminated at step 100 with constant excitation intensity and is illuminated at step 200' with a STED intensity modulated with a sine wave at a frequency ω, shown in FIG. 5a. At step 300' STED images are acquired, with detection techniques in lock-in at frequency ω, whereby the fluorescence signal is modulated and phase shifted, with the highest modulation at the periphery of the observation volume as schematically shown in FIG. 5b. The variations of the fluorescence intensity at frequency co for each pixel generate at step 400' a modulation M(x,y) of the image shown in pseudo-coloured scale in FIG. 5c, which can be used to improve the STED image resolution that would occur with a continuous STED beam, with standard STED technique, equal to I=$I_{max}$ and whose fluorescence image is shown in FIG. 5d. By using Eq. 10', the contribution of the fluorophores located at the center of the observation volume, shown in the image of FIG. 5e, is separated from the contribution of those situated at the periphery, whose fluorescence image is shown in FIG. 5f. The final image called m-STED, which is that of FIG. 5e given by the contribution of the fluorescence of the fluorophores at the center, has a higher resolution than the STED image with the maximum resolution of FIG. 5d, as shown by a comparison of the line profiles shown in FIG. 5g.

Figure 6:
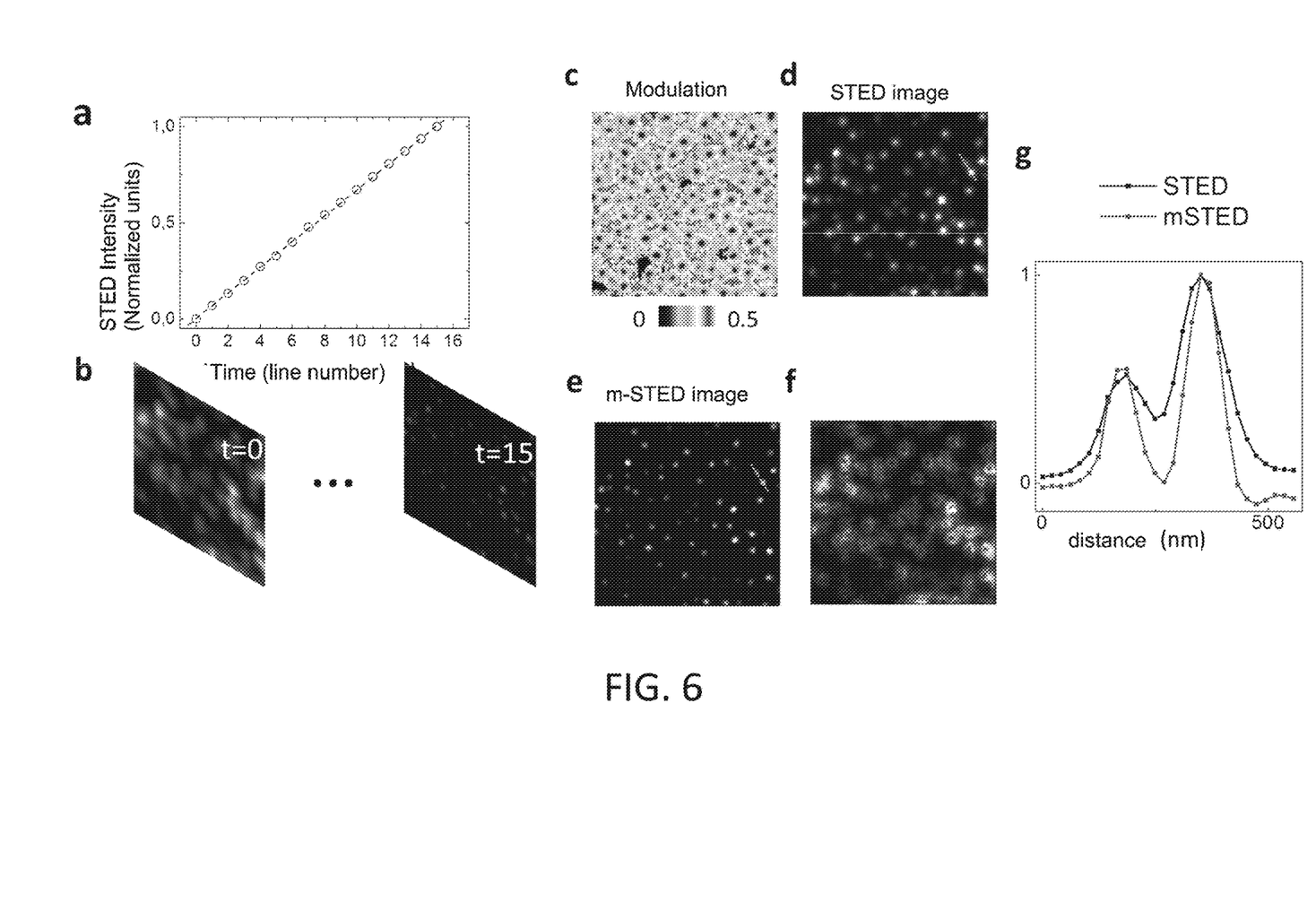
FIG. 6 schematically shows some of the experimental results, obtained by performing the first embodiment of the method of FIG. 2.

The authors have also performed experimental tests on fluorescent beads analysed with a STED microscopy apparatus integrated with the first preferred embodiment of the method. Some experimental results are reported in FIG. 6. The experiment was performed with a standard STED apparatus on a sample of fluorescent beads of about 40 nm in size. The intensity of the STED beam was modulated (step 200) with an AOM driven in such a way as to generate a linear ramp, from a value 0 to a value $I_{max}$, shown in FIG. 6a. The modulation of the intensity of the STED beam was synchronized with the line scanning time in such a way as to acquire n=16 consecutive lines at different power (see always FIG. 6a). A series of fluorescence STED images at increasing spatial resolution were then acquired (step 300), of which the first for $I_{STED}=0$ and last for $I_{STED}=I_{max}$ are shown in FIG. 6b. These series of images were subsequently processed (step 400) to obtain an image modulation M shown in FIG. 6c. FIG. 6d shows the STED image of fluorescence at maximum resolution. By applying, then, the SPLIT algorithm (step 500) to the image M of modulation the contribution by fluorophores positioned in the center of the observation volume, shown in FIG. 6e, is separated from that of the fluorophores positioned at the periphery of the observation volume, shown in FIG. 6f. As for the results of the simulations reported in FIGS. 3 and 5, the final image called m-STED, which is that of FIG. 6e given by the contribution of the fluorescence of the fluorophores at the center, has a higher resolution than the STED image with the maximum resolution of FIG. 6d, as shown by a comparison of the line profiles shown in FIG. 6g.

In the foregoing the preferred embodiments were described and some modifications of this invention have been suggested, but it should be understood that those skilled in the art can make modifications and changes without departing from the relative scope of protection, as defined by the appended claims.

The invention claimed is:

1. Method of modulated stimulated emission depletion microscopy at high spatial resolution (STED microscopy), comprising the following steps:
   A. illuminating a sample including one or more fluorophores in an observation volume with an excitation light beam having a constant excitation intensity, to energize said one or more fluorophores in the sample;
   B. illuminating the sample with a donut-shaped depletion light beam, to de-energize by stimulated emission said one or more excited fluorophores, obtaining an actual observation volume, the depletion light beam having an intensity $I_{STED}$ modulated over time $I_{STED}=I_{STED}(t)$ with a temporal pattern having a modulation period T;
   C. acquiring one or more fluorescence signals emitted from the sample by an image plane (x, y) of pixels;
   D. obtaining an image modulation M(x,y) of the sample on the image plane (x, y) of pixels on the basis of said one or more fluorescence signals acquired at step C;
   E. processing the image modulation M(x,y) to obtain a fraction $f_{center}(x,y)$ of fluorescence intensity on the image plane (x, y) of pixels, corresponding to a contribution to said one or more fluorescence signals, acquired at step C, originating from fluorophores present in a center of the actual observation volume of the sample;
   F. calculating a final image $F_{m\text{-}STED}(x,y)$ of the sample on the image plane (x, y) of pixels, from said one or more fluorescence signals acquired at step C and from the image modulation function M(x,y) obtained at step D, as follows:

$$F_{m\text{-}STED}(x,y) = f_{center}(x,y) F'_{STED}(x,y)$$

wherein $F_{STED}(x,y)$ is selected between a fluorescence image $\langle F_{t\text{-}STED}(x,y,t)\rangle$ averaged in time and any image of a temporal series $F_{t\text{-}STED}(x,y,t)$.

2. Method according to claim 1, wherein step C includes acquiring a time series of fluorescence images $F_{t\text{-}STED}(x,y,t)$, whereby step D includes calculating the image modulation M(x,y) from variations $|\delta F_{t\text{-}STED}(x,y,t)/F_{t\text{-}STED}(x,y,t)|$ of intensity of the acquired fluorescence images $F_{t\text{-}STED}(x,y,t)$.

3. The method according to claim 1, wherein step C is carried out by scanning an xy area of the sample in a synchronized manner with the modulation period T, whereby, a number of time points acquired being set equal to n, the scan temporal resolution required is T/n.

4. The method according to claim 3, wherein T is equal to a total pixel dwell time.

5. Method according to claim 3, wherein T/n is equal to a line scan time and n consecutive lines at different STED power are acquired.

6. Method according to claim 3, wherein the temporal pattern of $I_{STED}$ has a linear pattern with a period T>>1 ns.

7. Method according to claim 6, wherein the period T is comprised between 10 μs and 100 μs.

8. Method according to claim 7, wherein the period T is equal to 50 μs.

9. Method according to claim 1, wherein the intensity $I_{STED}$ is modulated at a frequency ω and step C includes a frequency acquisition of fluorescence signals with a lock-in acquisition and analysis apparatus directly implementing step D, providing as output a modulation $M_\omega(x,y)$ and also providing an output fluorescence image $\langle F_{t\text{-}STED}(x,y,t)\rangle$ averaged in time, whereby the final image $F_{m\text{-}STED}(x,y)$ of the sample is calculated at step F as:

$$F_{m\text{-}STED}(x, y) = \left[1 - \frac{M_\omega(x, y)}{K}\right]\langle F_t(x, y, t)\rangle$$

where K is a positive constant ranging between 0 and 1.

10. Method according to claim 9, wherein the temporal pattern of $I_{STED}$ has a sinusoidal pattern at frequency $\omega/2\pi \ll 1$ GHz.

11. Method according to claim 10, wherein the frequency $\omega/2\pi$ of the sinusoidal pattern is between 10 kHz to 1 MHz.

12. Method according to claim 11, wherein the frequency $\omega/2\pi$ of the sinusoidal pattern is equal to 100 kHz.

* * * * *